United States Patent [19]

Leong et al.

[11] Patent Number: 5,567,076

[45] Date of Patent: Oct. 22, 1996

[54] WELDING CHAMBER

[75] Inventors: Kerry Leong, Okanagan Mission; Dennis A. Connolly, Langley, both of Canada

[73] Assignee: Arthon Construction Ltd., British Columbia, Canada

[21] Appl. No.: 160,758

[22] Filed: Dec. 3, 1993

[51] Int. Cl.$^6$ .............................. E02D 19/04; E02D 23/00
[52] U.S. Cl. ................................. 405/11; 405/8; 405/188; 52/20
[58] Field of Search ............................... 405/8, 9, 11, 14, 405/74, 78, 188, 189, 190, 191, 192, 52; 52/19, 20

[56] References Cited

U.S. PATENT DOCUMENTS

| | | | |
|---|---|---|---|
| 808,638 | 1/1906 | Cunningham | 405/13 |
| 898,174 | 9/1908 | Beeson . | |
| 2,667,751 | 2/1954 | Osborn . | |
| 2,812,641 | 11/1957 | Elliott . | |
| 3,111,812 | 11/1963 | Clarke . | |
| 3,462,961 | 8/1969 | Berard . | |
| 3,466,880 | 9/1969 | Elliott . | |
| 3,768,265 | 10/1973 | Brouillette | 405/12 |
| 4,412,759 | 11/1983 | Britton et al. | 405/225 |
| 4,540,310 | 9/1985 | Ditcher et al. | 52/20 |

FOREIGN PATENT DOCUMENTS 1529792  10/1978  United Kingdom .

*Primary Examiner*—Michael Powell Buiz
*Assistant Examiner*—Frederick L. Lagman

[57] ABSTRACT

A method of positioning a pipeline across a water-course. A first coffer dam is formed to isolate a first area of the water-course and a first part of the pipeline is then positioned in the first area. A chamber is put at the distal end of the first part of the pipeline. The chamber has an upper portion with an open top and a lower portion as opposed ports to receive the pipeline. The first coffer dam is then dismantled. A second coffer dam is formed to isolate a second area of the water-course. The second area includes the chamber. The first and second areas of the water-course are positioned to include the path of the pipeline across the water-course. A second part of the pipeline is located in the chamber and a aligned with the first part of the pipeline. The ports are sealed around the pipeline. Water is removed from the chamber to allow make-up of the pipeline by joining of the first and second parts within the chamber. The upper portion of the chamber is removed and the second coffer dam is dismantled. The pipeline is then in position. The invention also extends to the chamber useful in the above method.

6 Claims, 3 Drawing Sheets

WELDING CHAMBER

FIELD OF THE INVENTION

This invention relates to a method of positioning a pipeline across a water-course and a chamber to allow formation of a joint in a pipeline in a water-course.

DESCRIPTION OF THE PRIOR ART

In installing a pipeline, it is frequently necessary to cross a water-course. Current environmental regulations, which are of increasing stringency, restrict what can be done at open cut crossings of rivers, streams and waterways. These regulations reflect an awareness of the damaging effect of silt and sediment to fish habitat and spawning beds. The regulations have necessitated the use of "modified open-cut" crossings. These techniques use water-dams or flumes, or a combination of these, and are used to isolate the construction activity from the waterway to eliminate or minimize the discharge of silt.

Both the above systems are effective, if used correctly, but have limitations in their application.

Fluming on its own is the simplest method of stream diversion and usually the most economical. The watercourse is intercepted and diverted through a suitably sized pipe or carrier. However, if the river flow is too large then diversion by means of fluming is impractical.

Methods of bagging or damming the river by forming a coffer dam are employed for larger flows to allow the river to be crossed in two stages, usually half of the river at a time. A coffer dam is defined as a temporary wall serving to exclude water from any site normally under water to facilitate the laying of foundation or any other similar work. The coffer dam may be formed by driving sheet piling or by the use of bags, for example water impermeable bags filled with sand or water or the like. After isolation by damming of the first half of the crossing a flexible casing pipe, with an inside diameter larger than the outside diameter of the pipe to be installed, is installed at the required depth of cover. The coffer dam is then dismantled and reinstalled on the opposite side of the crossing. This second installation is arranged so that it encompasses the end of the just installed carrier pipe. The second half of the crossing is excavated and the pipeline or carrier pipe is pulled through the casing pipe to the other side of the crossing. The modified open-cut crossing is complete.

This method, although very effective, is limited by the fact that many pipe materials do not have the natural flexibility to sag under and bend out of a water-course without buckling or damaging the pipe and coating. It is also impossible to pull a bent, rigid pipe through a casing pipe.

Accordingly, to-date there have been no methods of modified open-cut construction that permit the use of rigid pipelines requiring sag bends for the crossing of water-courses.

Optional methods of construction to overcome the limitations of the modified open-cut methods described above include aerial crossings of the river, directional drilling and horizontal augering beneath the river bed. However, these three techniques are usually costly. The directional drilling and the horizontal augering methods may also be limited by subsurface ground conditions.

Specific prior art known to applicant relates to submersible chambers. This prior art is: U.S. Pat. No. 3,466,880 to Elliott; U.S. Pat. No. 898,174 to Beeson; U.S. Pat. No. 3,111,812 to Clarke; U.S. Pat. No. 3,462,961 to Berard; U.S. Pat. No. 2,812,641 to Elliott and U.S. Pat. No. 2,667,751 to Osborn.

Of the above patents, Elliott is to a submersible chamber for a submerged pipeline. Beeson relates to a sectioned caisson. Clarke relates to a repair system in which a caisson is moved laterally against the pipeline. Elliott in U.S. Pat. No. 2,812,641 teaches a work-station for working on a pipeline. Osborn teaches the use of a repair chamber that is dropped over a pipeline and Berard teaches the use of a small chamber for use by a diver.

The present invention provides a method and a chamber useful in making a pipeline in a water-course with minimum disturbance of the environment and, in particular, with minimum generation of silt.

SUMMARY OF THE INVENTION

Accordingly, and in its first aspect, the present invention is a method of positioning a pipeline across a water-course comprising forming a first coffer dam to isolate a first area of the water-course; locating a first part of the pipeline in said first area; locating a chamber at the distal end of said first part of the pipeline, said chamber comprising an upper portion having an open top and a lower portion and having opposed ports to receive said pipeline; dismantling said first coffer dam; forming a second coffer dam to isolate a second area of the water-course, said second area including said chamber and said first and second areas of the water-course including the path of the pipeline across the water-course; locating a second part of the pipeline in said chamber, aligned with said first part of said pipeline; sealing said ports around said pipeline; removing water from said chamber to allow make-up of the pipeline by joining the first and second parts within the chamber; and dismantling said second coffer dam.

In a second aspect the invention is a chamber to allow formation of a joint in a pipeline in a water-course, the chamber comprising a base portion having a closed bottom; an upper portion to be received on said base portion and to be releasably sealed to said base; a pair of ports in said chamber to receive a pipe, each port receiving a separate part of the pipe; and means to seal said ports around said pipe portion.

DESCRIPTION OF THE PREFERRED EMBODIMENTS

Figure 1:
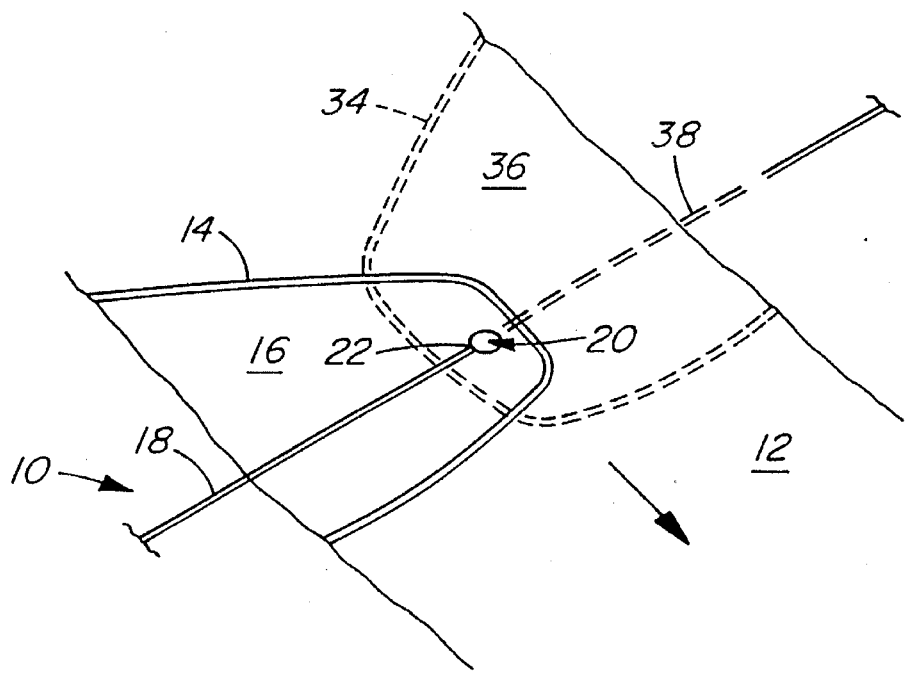
FIG. 1 is a plan view illustrating the method of the present invention.
Figure 2:
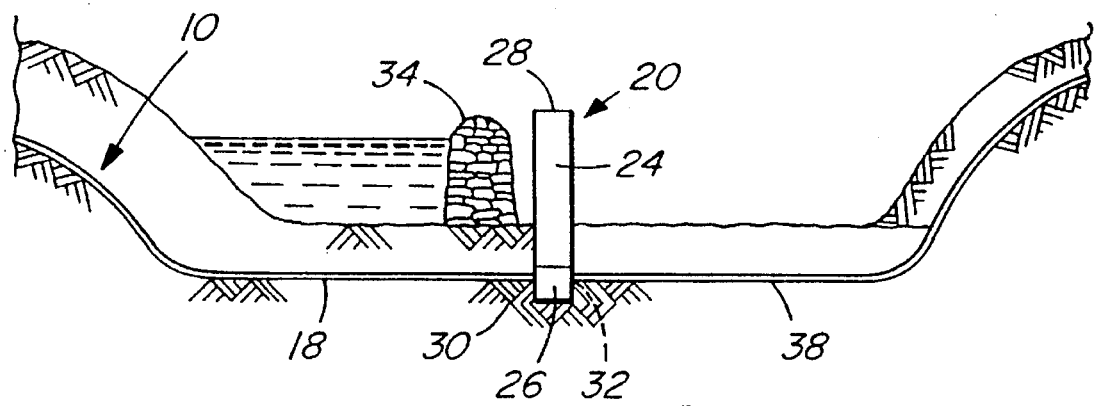
FIG. 2 is a side elevation showing a stage in the method of the present invention.

FIGS. 1 and 2, in particular, illustrate a method of positioning a pipeline 10 across a water-course 12. In the method a first coffer dam 14 is formed to isolate a first area 16 of the water-course 12. The coffer dam 14 made in conventional manner extends past the mid point of the water-course 12. This is not necessary but it is desirable. When the first coffer dam 14 is formed then a first part 18 of the pipeline 10 is installed in the first area 16. Usually the pipeline will be positioned in a trough.

A chamber 20 is located at the distal end 22 of the first part 18 of the pipeline 10. As discussed in more detail subsequently, the chamber 20 comprises an upper portion 24 having an open top 28 and a lower portion 26 and has opposed ports 30 and 32 to receive the pipeline 10.

When the first part 18 of the pipeline 10 and the chamber 20 are in position the first coffer dam 14 is dismantled. A second coffer dam 34 is then formed to isolate a second area 36 of the water course 12. This second area 36 includes the chamber 20, as shown in broken lines in FIG. 1, and the first and second areas 16 and 36 of the water-course 12 include the path of the pipeline 10 across the water-course 12. A second part 38 of the pipeline 10 is then located in the chamber 20 and aligned with the first part 18 of the pipeline 10. If necessary, and as shown in detail in FIG. 3, lugs 40 may be mounted at regular intervals around the circumference of the parts 18 and 38 and the parts then pulled together by the use of bolts or studs 42 engaging the lugs 40.

There are seals around the ports 30 and 32 of the chamber 20. These are sealed and water is then removed from the chamber 20. A joint between parts 18 and 38 can then be welded by a welder entering the chamber carry out the necessary weld. Finishing of the joint, for example by coating, may be carried out. The upper part 24 of the chamber 20 is removed from the water, any trough is back filled together with the lower part 26 of the chamber 20 which is left in position.

The second coffer dam 34 is then dismantled.

It may be necessary to ballast the chamber 20 prior to removing the water. This is to ensure that the chamber 20 will not float when the water is removed from it. In those circumstances, the ballast is removed from the chamber 20 before the upper portion 24 is removed.

Figure 3:
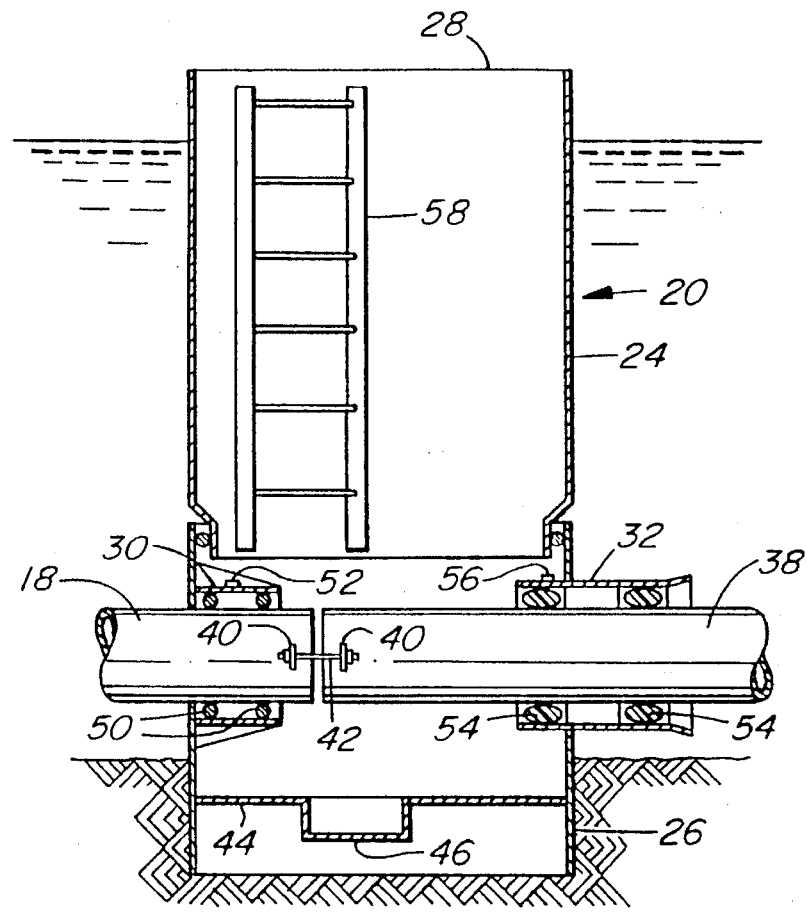
FIG. 3 is a section through a chamber according to the present invention.
Figure 4:
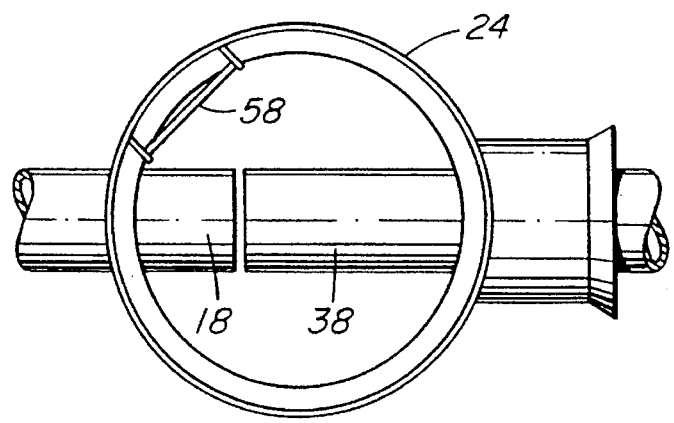
FIG. 4 is a plan view of the chamber of FIG. 3.
Figure 5:
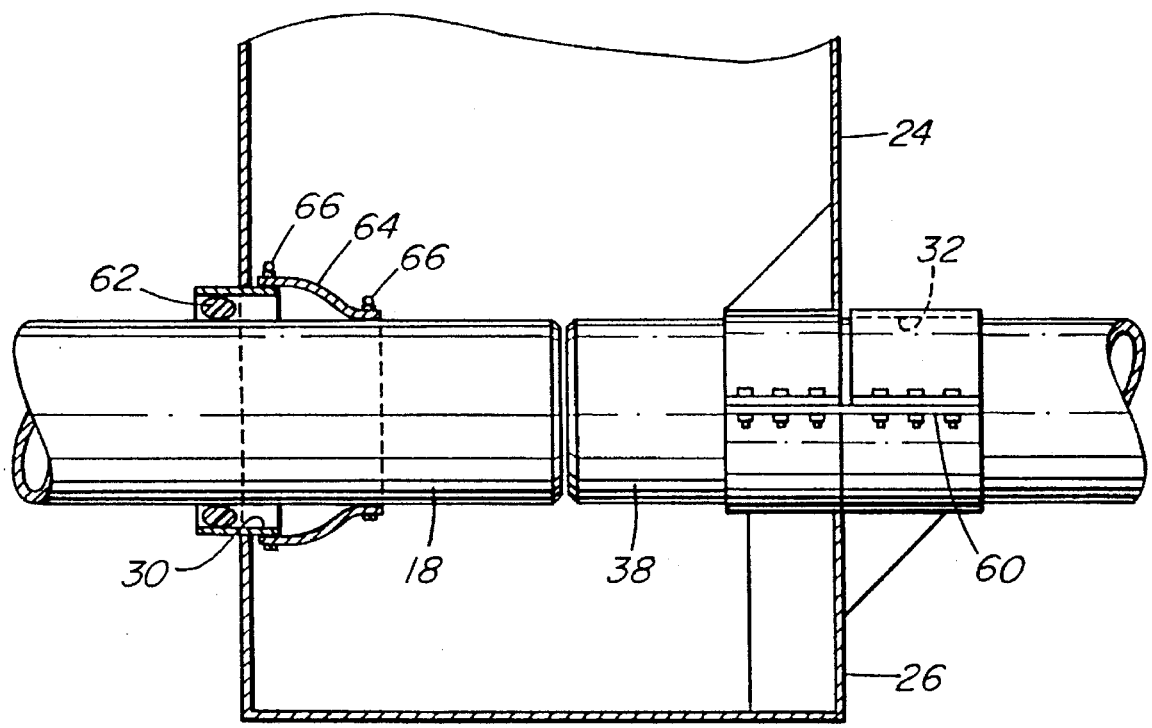
FIG. 5 illustrates a further embodiment of the chambers of the present invention.

The chamber 20 of the present invention is shown more particularly in FIGS. 3 to 5.

FIG. 3 shows the base portion 26 having a closed bottom 44. There is a sump 46 in the bottom 26 to facilitate the pumping of water from the chamber 20. Upper portion 24 is received on the base portion 26 and releasably sealed to the base portion. As shown in FIG. 3 the upper portion 24 telescopes within the lower portion 26 and there is a seal 48, for example a heavy duty O-ring, around the joint that acts to seal the joint. The ports 30 and 32 of the chamber 26 are aligned and able to receive the pipe 10. Each port receives a separate part 18 or 38 of the pipe 10, as shown particularly in FIG. 3.

There are means to seal the ports 30 and 32 around the pipe portions. FIG. 3 shows the use of O-rings at port 30. These may be supplemented by the injection of a rigid or flexible chemical sealing grout through a nipple 52 positioned on the port 30. The O-rings may be replaced by a pneumatic seal or any other type of appropriate seal.

The port 32 comprises a steel pipe ring. There are pneumatic inflatable seals 54 located within the port 32, around the second pipe portion 38. A chemical grout again may be injected between seals 54 through a nipple 56.

FIG. 3 illustrates an embodiment of the invention in which the ports 30 and 32 are both in the lower portion 26. FIG. 3 also shows the positioning of a ladder 58 inside the chamber so that a welder may get to the joint. Furthermore, the chamber 20 will normally include a pipe (not shown) so that the water may be pumped from the chamber once the seals have been made good. An air line can, of course, be inserted to ventilate, especially while the welder is welding.

The dimensions of the chamber, particularly the diameter, depends on the diameter of the pipeline and the space required by the diver and the welder to make the joint. A diver may be required to position the pipeline in the chamber but for economy it is preferred to use mechanical methods of providing line-up and sealing to the port, thus eliminating the necessity for a diver.

FIG. 5 shows modification of the embodiment of FIG. 3. Here the ports 30 and 32 are formed in both the upper 24 and lower portion 26. As shown in FIG. 5 there is a bolted flange 60, usually with a seal or grout between the abutting surfaces to locate the top and bottom portions 24 and 26 relative to each other. Port 30 has inflatable seals 62 at the outer extremity and a flexible inner seal 64 mounted by gear clips 66. A flexible seal is desirable to allow movement of the pipe part 18 to ensure proper abutment at the joint with part 38. Inflatable seals 62 may be pneumatic or they may be replaced by mechanical seals or any form of appropriate seal. Similarly gear clips 66 can be replaced by any mechanical clamp able to seal the flexible inner seal 64.

The present invention thus provides a method and an apparatus for providing a simple procedure for welding portions of a pipeline together. The method has very little adverse effect on the environment. It is rapid and easy to carry out.

Although the forgoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

We claim:

1. A method of positioning a pipeline across a water-course comprising:

forming a first coffer dam to isolate a first area of the water-course;

locating a first part of the pipeline in said first area;

locating a chamber at the distal end of said first part of the pipeline, said chamber comprising an upper portion having an open top and a lower portion and having opposed ports to receive said pipeline;

dismantling said first coffer dam;

forming a second coffer dam to isolate a second area of the water-course, said second area including said chamber and said first and second areas of the watercourse including the path of the pipeline across the water-course;

locating a second part of the pipeline in said chamber, aligned with said first part of said pipeline;

sealing said ports around said pipeline;

removing water from said chamber to allow make-up of the pipeline by joining the first and second parts within the chamber;

removing the upper portion of the chamber; and dismantling said second coffer dam.

2. A method as claimed in claim 1 including forming a trough to receive said pipeline in said first and second areas.

3. A method as claimed in claim 1 in which the lower part of the chamber has a closed base.

4. A method as claimed in claim 1 including ballasting said chamber prior to the removing of the water.

5. A method as claimed in claim 1 including leaving said lower portion of the chamber in place with said pipeline.

6. A method as claimed in claim 1 in which make-up of the pipeline comprises abutting the ends of the first and second parts of the pipeline, welding or coupling the abutted ends and coating the pipeline.

* * * * *